(12) United States Patent
Riddle et al.

(10) Patent No.: US 7,813,352 B2
(45) Date of Patent: Oct. 12, 2010

(54) PACKET LOAD SHEDDING

(75) Inventors: Guy Riddle, Los Gatos, CA (US); Curtis Vance Bradford, Los Gatos, CA (US); Maddie Cheng, Los Gatos, CA (US)

(73) Assignee: Packeteer, Inc., Cupertino, CA (US)

( * ) Notice: Subject to any disclaimer, the term of this patent is extended or adjusted under 35 U.S.C. 154(b) by 182 days.

(21) Appl. No.: 12/100,850

(22) Filed: Apr. 10, 2008

(65) Prior Publication Data

US 2008/0285445 A1  Nov. 20, 2008

Related U.S. Application Data

(63) Continuation of application No. 10/843,185, filed on May 11, 2004, now Pat. No. 7,376,080.

(51) Int. Cl.
*H04L 12/28* (2006.01)
(52) U.S. Cl. .................. 370/395.42; 370/235
(58) Field of Classification Search .............. 370/229, 370/230, 235, 241, 412, 395.42; 709/225; 711/713
See application file for complete search history.

(56) References Cited

U.S. PATENT DOCUMENTS

| | | | |
|---|---|---|---|
| 5,361,372 A | | 11/1994 | Rege et al. |
| 6,918,005 B1 * | | 7/2005 | Marchant et al. ............ 711/113 |
| 2002/0083175 A1 | | 6/2002 | Afek et al. |
| 2004/0081167 A1 * | | 4/2004 | Hassan-Ali et al. .... 370/395.42 |
| 2005/0041595 A1 * | | 2/2005 | Uzun et al. .................. 370/252 |

* cited by examiner

*Primary Examiner*—Donald L Mills
*Assistant Examiner*—Wanda Z Russell
(74) *Attorney, Agent, or Firm*—Baker Botts L.L.P.

(57) ABSTRACT

Methods, apparatuses and systems directed to enhanced packet load shedding mechanisms implemented in various network devices. In one implementation, the present invention enables a selective load shedding mechanism that intelligently discards packets to allow or facilitate management access during DoS attacks or other high traffic events. In one implementation, the present invention is directed to a selective load shedding mechanism that, while shedding load necessary to allow a network device to operate appropriately, does not attempt to control traffic flows, which allows for other processes to process, classify, diagnose and/or monitor network traffic during high traffic volume periods. In another implementation, the present invention provides a packet load shedding mechanism that reduces the consumption of system resources during periods of high network traffic volume.

15 Claims, 9 Drawing Sheets

Fig._1

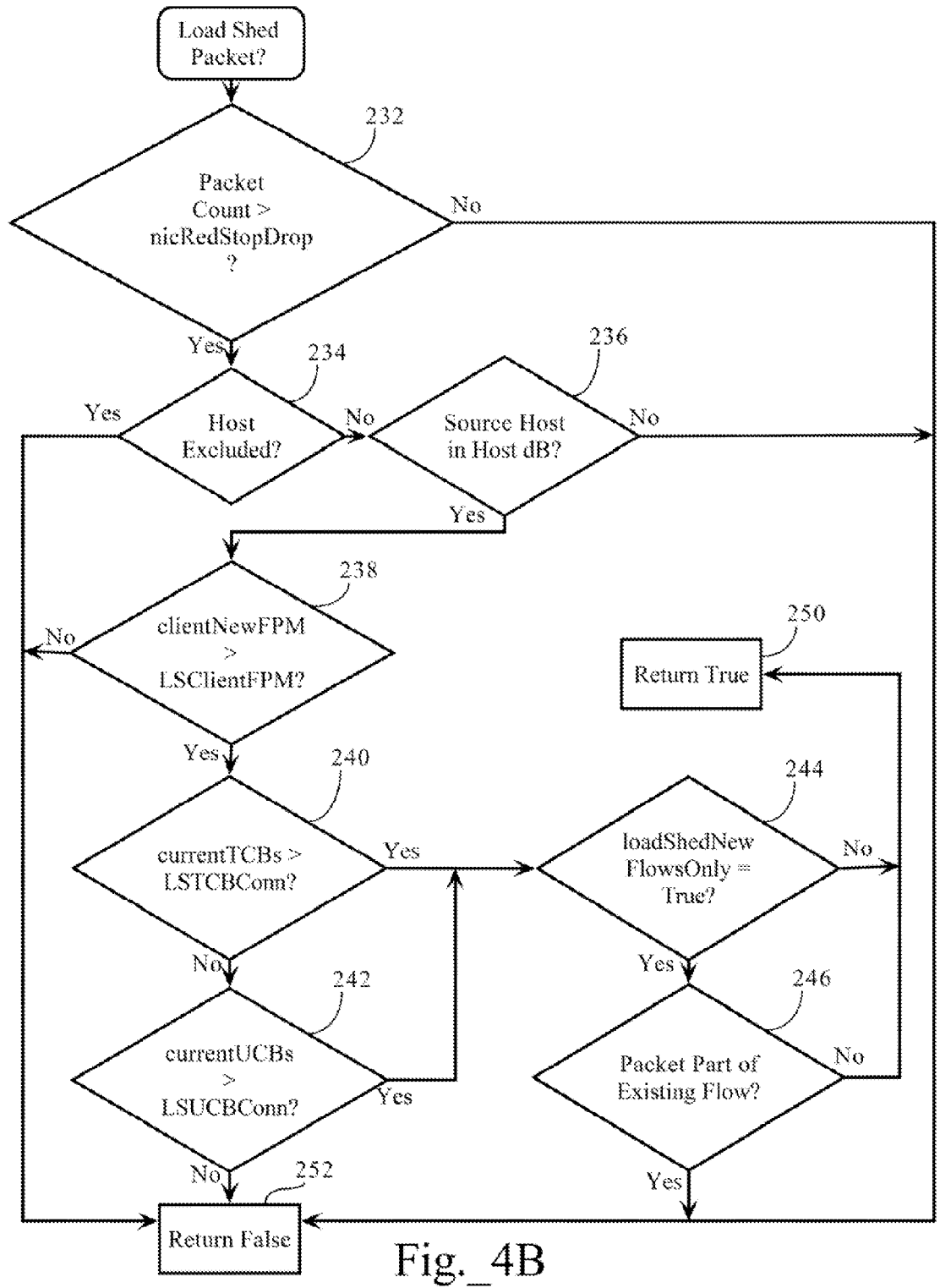
Fig._4B

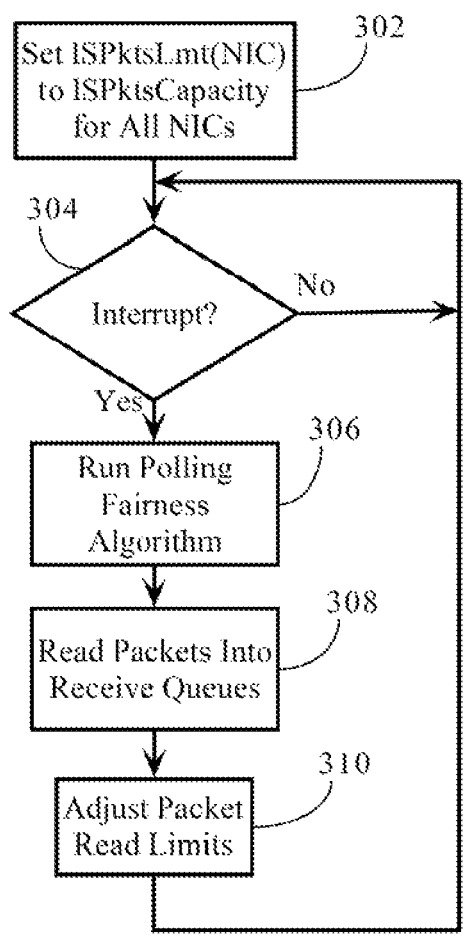
Fig. _5A
| 0 | 1 | 2 | 3 | 4 | 5 |
|---|---|---|---|---|---|
| 2 | 3 | 4 | 5 | 0 | 1 |
| 4 | 5 | 0 | 1 | 2 | 3 |
| 1 | 0 | 5 | 4 | 3 | 2 |
| 5 | 4 | 3 | 2 | 1 | 0 |
| 3 | 2 | 1 | 0 | 5 | 4 |
Fig. _6A
| 5 | 0 | 1 | 2 | 3 | 4 |
|---|---|---|---|---|---|
| 1 | 2 | 3 | 4 | 5 | 0 |
| 3 | 4 | 5 | 0 | 1 | 2 |
| 2 | 1 | 0 | 5 | 4 | 3 |
| 0 | 5 | 4 | 3 | 2 | 1 |
| 4 | 3 | 2 | 1 | 0 | 5 |
Fig. _6B
| 0 | 1 | 2 | 3 |
|---|---|---|---|
| 2 | 3 | 0 | 1 |
| 1 | 0 | 3 | 2 |
| 3 | 2 | 1 | 0 |
Fig. _7A
| 3 | 0 | 1 | 2 |
|---|---|---|---|
| 1 | 2 | 3 | 0 |
| 2 | 1 | 0 | 3 |
| 0 | 3 | 2 | 1 |
Fig. _7B

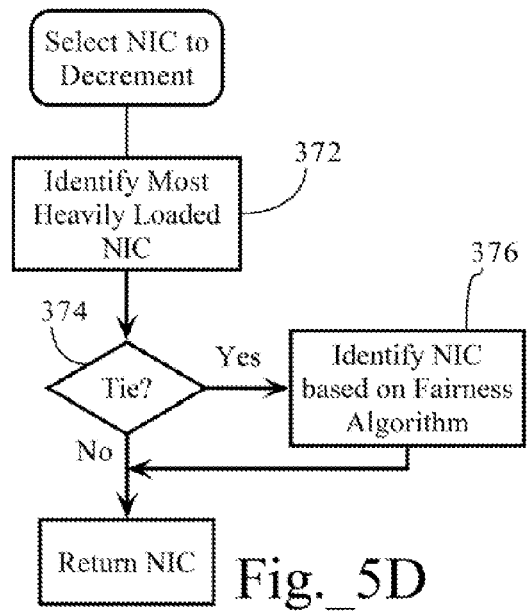
Fig. _5D
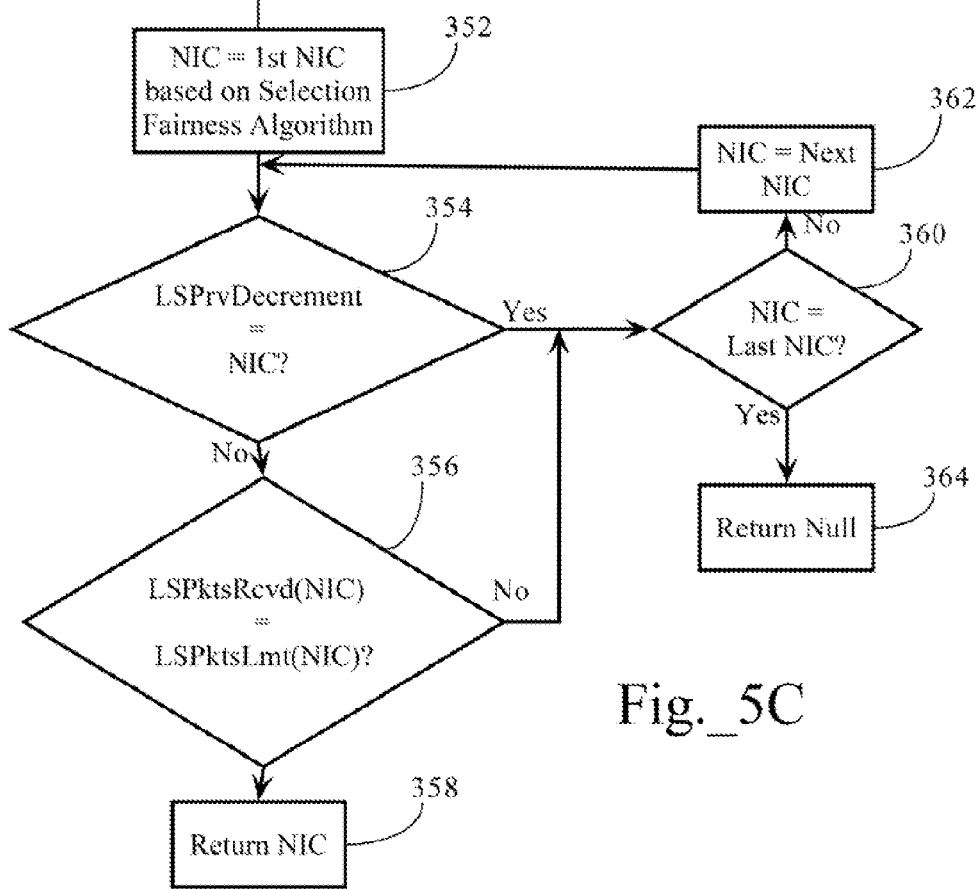
Fig. _5C

PACKET LOAD SHEDDING

CROSS-REFERENCE TO RELATED APPLICATIONS AND PATENTS

The present application is a continuation of U.S. application Ser. No. 10/843,185, filed May 11, 2004 now U.S. Pat. No. 7,376,080, which is incorporated by reference herein for all purposes. This application also makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/099,629 in the name of Brett Galloway, Mark Hill, and Anne Cesa Klein, entitled "Method And System For Controlling Network Traffic Within The Same Connection With Different Packet Tags By Varying The Policies Applied To A Connection;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/453,345, in the name of Scott Hankins, Michael R. Morford, and Michael J. Quinn, entitled "Flow-Based Packet Capture;" and U.S. patent application Ser. No. 10/611,573, in the name of Roopesh Varier, David Jacobson, and Guy Riddle, entitled "Network Traffic Synchronization Mechanism;" and U.S. patent application Ser. No. 10/676,632, in the name of Roopesh Varier, Guy Riddle, and David Jacobson, entitled "Dynamic Bandwidth Management Responsive to Access Link State in Redundant Network Topologies."

FIELD OF THE INVENTION

The present invention relates to computer networks and, more particularly, to methods, apparatuses and systems directed to packet load shedding in network devices.

BACKGROUND OF THE INVENTION

Enterprises have become increasingly dependent on computer network infrastructures to provide services and accomplish mission-critical tasks. Indeed, the performance, security, and efficiency of these network infrastructures have become critical as enterprises increase their reliance on distributed computing environments and wide area computer networks. To that end, a variety of network devices have been created to provide data gathering, reporting, and/or operational functions, such as firewalls, gateways, packet capture devices, bandwidth management devices, application traffic monitoring devices, and the like. For example, the TCP/IP protocol suite, which is widely implemented throughout the world-wide data communications network environment called the Internet and many wide and local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily. In response, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, network security is another concern, such as the detection of computer viruses, as well as prevention of Denial-of-Service (DoS) attacks on, or unauthorized access to, enterprise networks. Accordingly, firewalls and other network devices are deployed at the edge of such networks to filter packets and perform various operations in response to a security threat. In addition, packet capture and other network data gathering devices are often deployed at the edge of, as well as at other strategic points in, a network to allow network administrators to monitor network conditions.

Enterprises network topologies can span a vast array of designs and connection schemes depending on the enterprise's resource requirements, the number of locations or offices to connect, desired service levels, costs and the like. A given enterprise often must support multiple LAN or WAN segments that support headquarters, branch offices and other operational and office facilities. Indeed, enterprise network design topologies often include multiple, interconnected LAN and WAN segments in the enterprise's intranet, and multiple paths to extranets and the Internet. Enterprises that cannot afford the expense of private leased-lines to develop their own WANs, often employ frame relay, or other packet switched networks, together with Virtual Private Networking (VPN) technologies to connect private enterprise sites via a service provider's public network or the Internet. Some enterprises also use VPN technology to create extranets with customers, suppliers, and vendors. These network topologies often require the deployment of a variety of network devices at each remote facility. In addition, some network systems are end-to-end solutions, such as application traffic optimizers using compression tunnels, requiring network devices at each end of a communications path between, for example, a main office and a remote facility.

Denial-of-Service (DoS) attacks are a common concern among network administrators. For example, a distributed denial-of-service (DDoS) attack is one in which a multitude of compromised hosts attack a single target, such as a web server, by transmitting large numbers of packets to deny service for legitimate users of the targeted system. Specifically, the veritable flood of incoming messages to the targeted system essentially forces it to shut down, thereby denying services of the system to legitimate users. A hacker, for example, may implement a DDoS attack by identifying and exploiting vulnerabilities in various end systems that are reachable over the Internet. For example, a hacker may identify a vulnerability in one end system connected to a network, making it the DDoS "master." It is from the master system that the intruder identifies and communicates with other systems connected to the network that can be compromised. The DDoS master installs hacking tools on multiple, compromised systems. With a single command, the hacker can instruct the compromised hosts to launch one of many DoS attacks against specified target systems.

The DoS attacks launched by the compromised systems can take a variety of forms. Common forms of denial of service attacks, for example, include buffer overflow attacks and SYN attacks. In a buffer overflow attack, compromised systems send more network traffic to a network address than the data buffers supporting the targeted system can handle. Certain buffer overflow attacks exploit known characteristics of the buffers supporting a given network application, such as email servers. For example, a common buffer overflow attack is to send email messages with attachments having large file names. The large attachment file names quickly flood the buffer associated with common email applications. Other buffer overflow attacks involve the transmission of other types of packets, such as Internet Control Message Protocol (ICMP) packets and Distributed-Component Object Model (DCOM) packets.

So-called SYN attacks are also common. When a session is initiated between a Transport Control Program (TCP) client and TCP server, a very small buffer space exists to handle the usually rapid "hand-shake" messages that sets up the TCP connection. The session-establishing packets include a SYN field that identifies the sequence in the message exchange. An attacker can send a number of connection requests very rapidly and then fail to respond to the reply. This leaves the first packet in the buffer so that other, legitimate connection requests cannot be accommodated. Although the packet in the buffer is dropped after a certain period of time without a reply, the effect of many of bogus SYN packets is to make it difficult for legitimate requests for a session to get established.

In addition to posing a problem for the targeted end systems, these DoS attacks also create problems for network devices, such as application traffic management systems, disposed at the edge of enterprise networks and/or at a point in the communications path between a compromised end system and a targeted system. For example and referring to FIG. 1, assume for didactic purposes, that end systems 42 on network 40 have been comprised and have initiated a DoS attack against targeted system 43. As discussed above, the compromised end systems 42 transmit a large number of ICMP or SYN packets, for example, to the targeted system 43. An application traffic management device 30, for example, encounters these packets and, pursuant to its configuration, processes the packets as part of its application traffic management functions. Processing the inordinate number of packets from the compromised end systems, however, quickly overwhelms the capacity of the network device 30, such as the system bus, and central processing unit (CPU), requiring that a large number of packets be dropped. One prior art load shedding mechanism is referred to as Random Early Discard (RED). According to such Random Early Discard mechanisms, packets are chosen at random for discard to shed the load placed on application network device 30 by the DoS attack.

The use of Random Early Discard mechanisms can be problematic. For example, random early discard techniques adversely affect the flow of legitimate network traffic. Indeed, random early discards may actually exacerbate the problem due to additional network traffic associated with re-transmissions of the dropped packets. Beyond regular network traffic, the packets randomly chosen for discard may include Web User Interface (WUI), or Command Line Interface (CLI), session packets intended for application network device 30, rendering it difficult or impossible for network administrators to access the device 30 at such a critical time. For instance, this circumstance may render it difficult for a network administrator to receive diagnostic or monitoring data from application network device 30, and/or to configure application network device 30 in a manner that responds to the DoS attack.

In addition, even with random early drop mechanisms, the system resources of network device 30 can be severely impacted. For example, inbound packets received at network device 30 typically consume device resources, such as the available bandwidth across the system bus of network device 30, before being discarded. This circumstance ties up system resources for other processing tasks. For example, by consuming large amounts of bandwidth across the system bus, the large number of inbound packets adversely affect the processing of network traffic and the egress of packets from network device 30. Traffic or packet through-put is affected, therefore, while network device 30 waits for system resources to become available.

In light of the foregoing, a need in the art exists for methods, apparatuses and systems directed to enhanced load shedding mechanisms that address the foregoing limitations. For example, a need in the art exists for methods, apparatuses and systems enabling preferential packet load shedding mechanisms that reduce the chance that legitimate network traffic is dropped during a DoS attack or other event where one or more hosts generate a disproportionate amount of network traffic. A need also exists in the art for methods, apparatuses and systems that facilitate access to network devices during DoS attacks or other similar events. A need further exists in the art for packet load shedding mechanisms that reduce the impact on system resources. Embodiments of the present invention substantially fulfill these needs.

SUMMARY OF THE INVENTION

The present invention provides methods, apparatuses and systems directed to enhanced packet load shedding mechanisms implemented in various network devices. In one implementation, the present invention enables a selective load shedding mechanism that intelligently discards packets to allow or facilitate management access during DoS attacks or other high traffic events. In one implementation, the present invention is directed to a selective load shedding mechanism that, while shedding load necessary to allow a network device to operate appropriately, does not attempt to control traffic flows, which allows for other processes to process, classify, diagnose and/or monitor network traffic during high traffic volume periods. In another implementation, the present invention provides a packet load shedding mechanism that reduces the consumption of system resources during periods of high network traffic volume.

DESCRIPTION OF THE DRAWINGS

FIG. 4B is a flow chart diagram providing a method, according to another embodiment of the present invention, directed to preferentially shedding packet load.

FIG. 5A is a flow chart diagram showing an overall process flow, according to an implementation of the present invention.

FIG. 5C is a flow chart diagram illustrating the decisional logic, according to one implementation of the present invention, directed to selecting an interface read limit to increment.

FIG. 5D is a flow chart diagram setting forth the decisional logic, according to one implementation of the present invention, directed to selecting an interface read limit to decrement.

FIG. 6A is a matrix illustrating a polling fairness algorithm according to one implementation of the present invention.

FIG. 6B is a matrix illustrating a selection fairness algorithm according to an implementation of the present invention.

FIG. 7A is a matrix illustrating a polling fairness algorithm according to another implementation of the present invention.

FIG. 7B is a matrix illustrating a selection fairness algorithm according to another implementation of the present invention.

DESCRIPTION OF PREFERRED
EMBODIMENT(S)

A. General Network Device Software and Hardware Architecture

Figure 1:
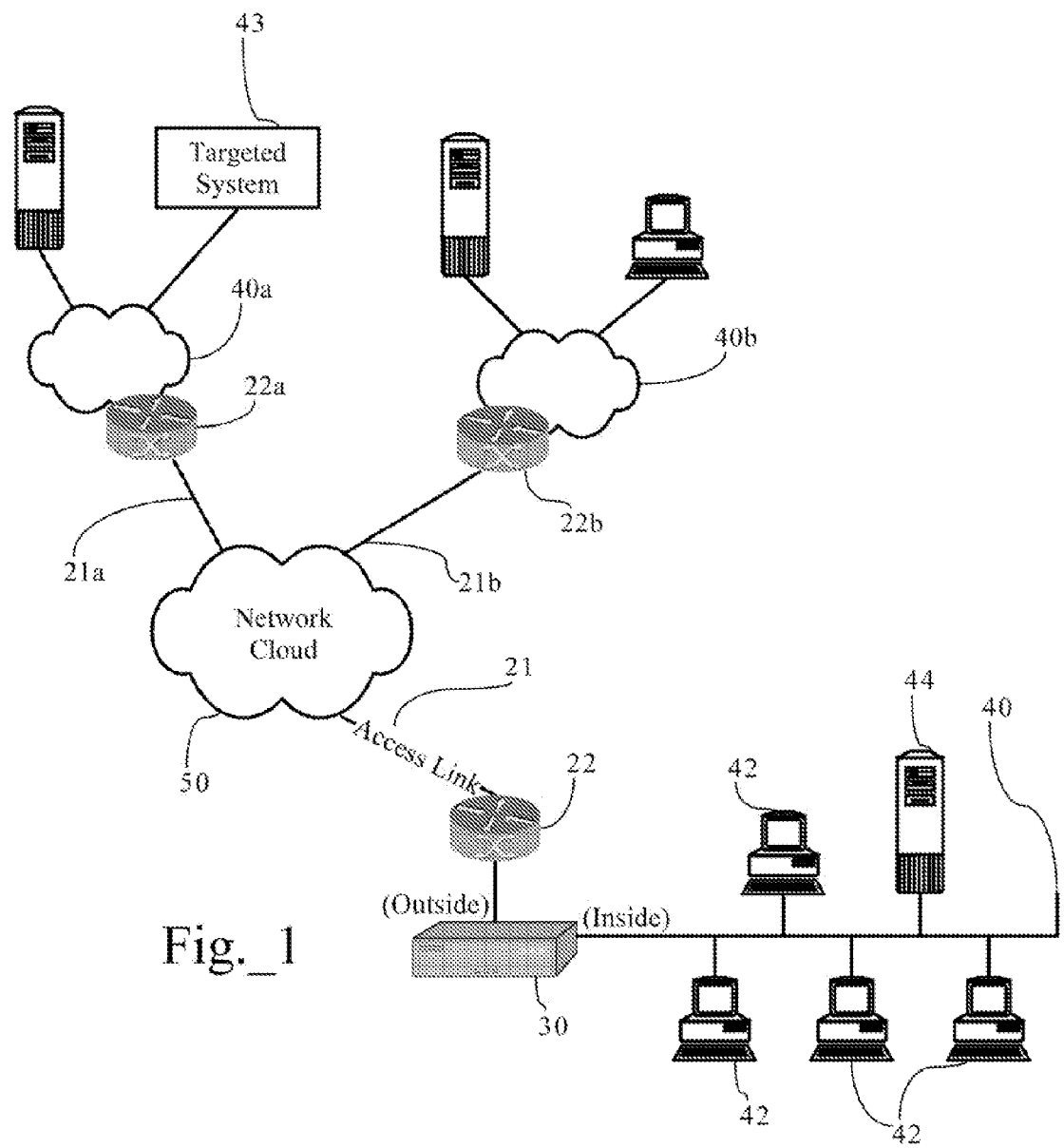
FIG. 1 is a schematic diagram illustrating a computer network including a network device according to an implementation of the present invention.

FIG. 1 illustrates a network environment in which embodiments of the present invention may operate. As FIG. 1 shows, network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and network 40. The computer network environment, including network 40 and computer network 50 is a packet-based communications environment, employing TCP/IP protocols, and/or other suitable protocols, and has a plurality of interconnected digital packet transmission stations or routing nodes. Network 40 can be a local area network, a wide area network, or any other suitable network. As FIG. 1 also illustrates, network device 30, in one implementation, is deployed at the edge of network 40. In one implementation, network device 30 is a network application traffic management device operative to manage data flows traversing access link 21. However, the load shedding functionality according to the present invention can be integrated into a variety of network devices, such as proxies, firewalls, packet capture or network monitoring equipment, VPN servers, web services network gateways or brokers, and the like. As FIG. 1 illustrates, network 50 interconnects networks 40, 40b which may be networks supporting branch office facilities, and network 40a, which may support a central operating or headquarters facility. Furthermore, although not shown in FIG. 1, additional network devices may be deployed at the edge of networks 40a, 40b, as well.

Figure 2:
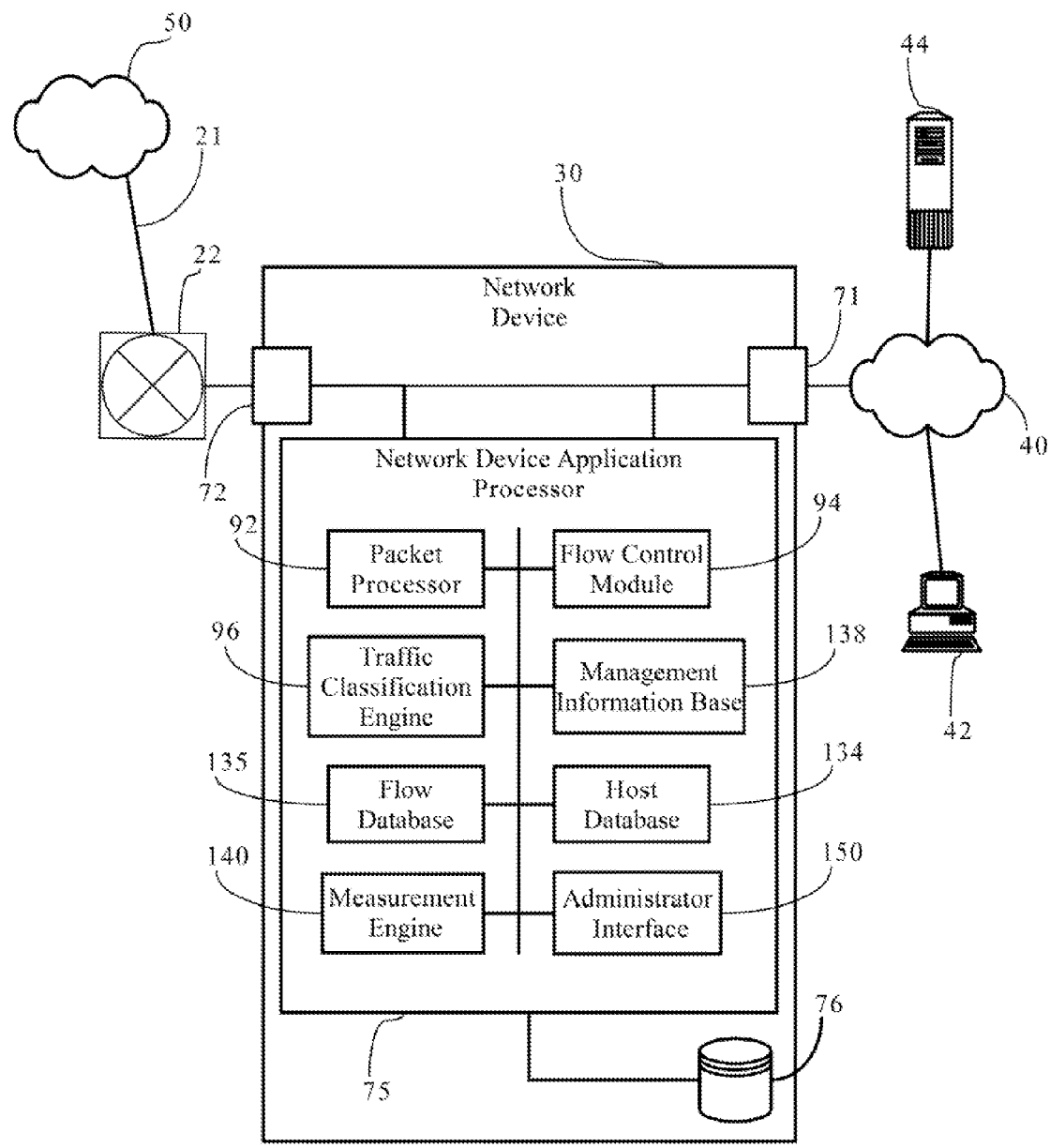
FIG. 2 is a functional block diagram illustrating the functionality of a network device configured according to an implementation of the present invention.

As FIG. 2 illustrates, network device 30, in one implementation, comprises network device application 75, and first and second network interfaces 71, 72, which operably connect network device 30 to the communications path between router 22 and network 40. Network device application 75 generally refers to the functionality implemented by network device 30, such as network monitoring or reporting, application traffic management, security, virtual-private networking, and the like. In one embodiment, network device application 75 is a combination of hardware and software, such as a central processing unit, memory, a system bus, an operating system, device drivers, and one or more software modules implementing the functions performed by network device, as well as the automated deployment and configuration functionality described herein.

In one embodiment, first and second network interfaces 71, 72 are the hardware communications interfaces that receive and transmit packets over the computer network environment. In one implementation first and second network interfaces 71, 72 reside on separate network interface cards operably connected to the system bus of network device 30. In another implementation, first and second network interfaces reside on the same network interface card. In addition, the first and second network interfaces 71, 72 can be wired network interfaces, such as Ethernet (IEEE 802.3) interfaces, and/or wireless network interfaces, such as IEEE 802.11, BlueTooth, satellite-based interfaces, and the like. In one implementation, network device 30 includes a network interface driver, such as NIC driver 83 (see FIG. 3), that controls operation of network interfaces 71, 72. In other implementations, each network interface 71, 72 can be controlled by a separate driver. As FIG. 2 illustrates, network device 30, in one embodiment, includes persistent memory 76, such as a hard disk drive or other suitable memory device, such writable CD, DVD, or tape drives. Network device 30 can include additional network interfaces to support additional access links or other functionality.

Figure 3:
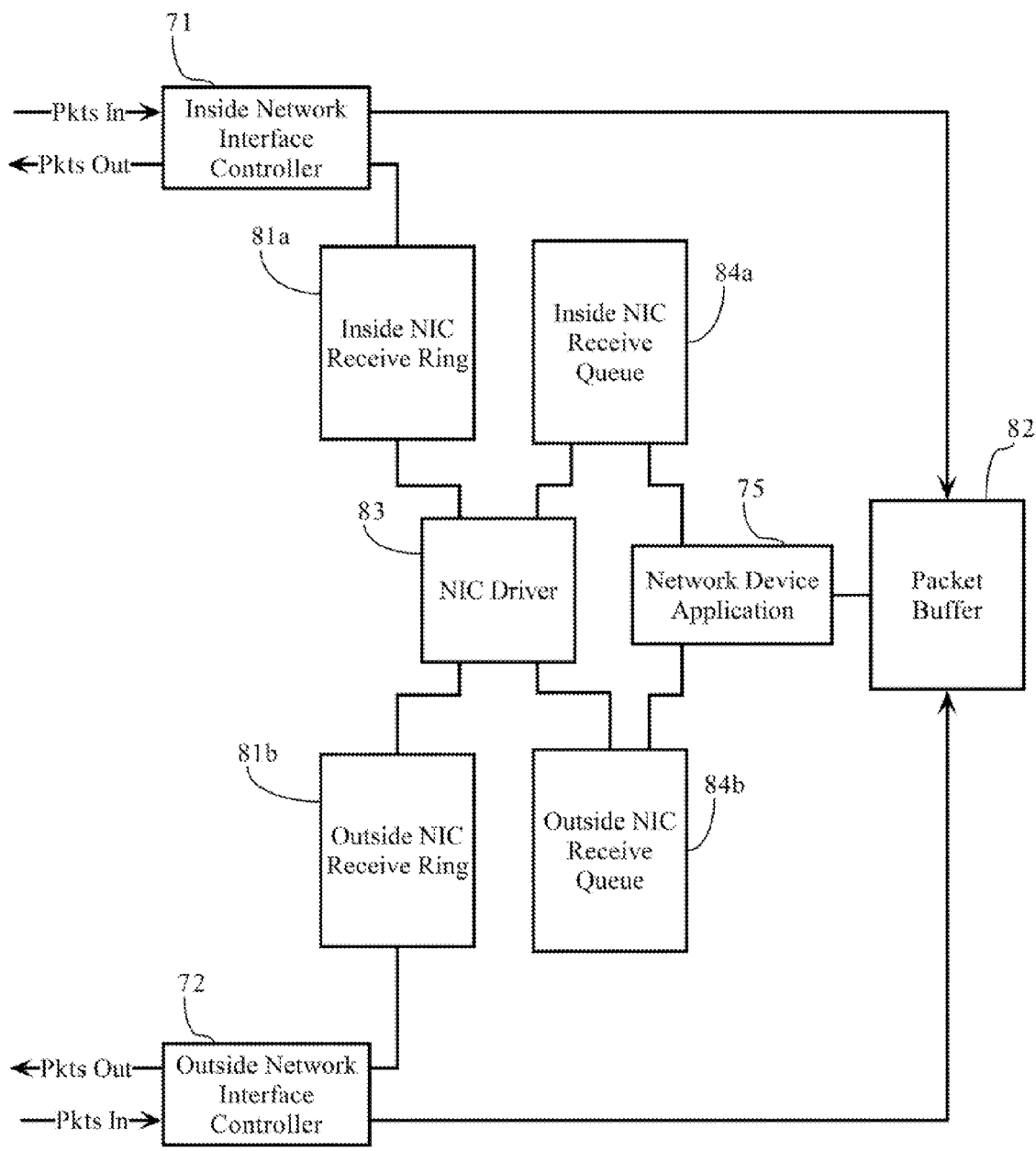
FIG. 3 is a functional block diagram illustrating a process flow, according to one implementation of the present invention, among various hardware and software modules.

FIG. 3 provides a more detailed illustration of the functional modules, and data structures, relevant to describing implementations and operation of the present invention. As FIG. 3 illustrates, network device 30 includes inside NIC receive ring 81a, outside NIC receive ring 81b, inside NIC receive queue 84a, outside NIC receive queue 84b, NIC driver 83, and packet buffer 82. Packet buffer 82 is operative to store packets received at network interfaces 71, 72. To summarize the operations (described in more detail below) associated with receiving and ultimately processing packets, network interface 71, for example, receives and stores a packet in packet buffer 82. Network interface 71 also maintains a pointer to the packet in inside NIC receive ring 81a. As discussed more fully below, NIC driver 83 determines whether to queue or otherwise retain the packet, or to discard it. In one implementation, NIC driver 83, operating at periodic interrupts, writes pointers out of inside NIC receive ring 81a and into inside NIC receive queue. Network device 30 operates substantially identically for packets received at outside network interface 72. Network device application 75, in one implementation, operates on packets stored in packet buffer 82 by accessing the memory address spaces (pointers) to the packets in inside NIC receive queue 84a and outside NIC receive queue 84b. As FIG. 3 illustrates, in one implementation, a packet received at inside network interface 71 is generally transmitted, after processing by network device application, from outside network interface 72. The rings and other data structures supporting the transmission of packets from network interfaces 71, 72 are not shown.

In one implementation, packet buffer 82 comprises a series of fixed-size memory spaces for each packet (e.g., 50,000 spaces). In other implementations, packet buffer 82 includes mechanisms allowing for variable sized memory spaces depending on the size of the packet. Inside NIC receive ring 81a is a circular queue or ring of memory addresses (pointers) corresponding to packets stored in packet buffer 82. In one implementation, inside NIC receive ring 81a includes 256 entries; however, the number of entries is a matter of engineering and design choice. In one implementation, each entry of inside NIC receive ring 81a includes a field for a memory address, as well as other fields for status flags and the like. For example, one status flag indicates whether the memory address space is empty or filled with a packet. Inside NIC receive ring 81a also maintains head and tail memory addresses, as described below. In one implementation, network interface 71 also maintains the head and tail memory address spaces in its registers. The head memory address space corresponds to the next available memory space in packet buffer 82 to which the next packet is to be stored. Accordingly, when network interface 71 receives a packet, it checks the head address register to determine where in the system memory reserved for packet buffer 82 to store the packet. After the packet is stored, the status flag in the ring entry is changed to filled. In addition, the system memory returns a memory address for storing the next received packet, which is stored in the next entry in inside NIC receive ring 81a, in addition, the head address register is advanced to this next memory address. The tail memory address space corresponds to the earliest received packet which has not been processed by NIC driver 83. In one implementation, network interface 71 also maintains a copy of inside NIC receive ring 81a in a memory unit residing on the network interface hardware itself. As is conventional, network interface 71 discards packets when inside NIC receive ring 81a is full—i.e., when the tail and head memory addresses are the same.

As discussed above, NIC driver 83 is operative to read packet pointers from inside NIC receive ring 81a to inside NIC receive queue 84a. In one implementation, NIC driver 83 operates on inside NIC receive ring 81a by accessing the tail memory address to identify the earliest received packet. To write the packet in the inside NIC receive queue 84a, NIC driver 83 copies the memory address into inside NIC receive queue, sets the status flag in the entry in inside NIC receive ring 81a corresponding to the tail memory address to empty, and advances the tail memory address to the next entry in the ring. NIC driver 83 can discard a packet by simply dropping it from inside NIC receive ring 81a (as discussed above), and not writing it into inside NIC receive queue 84a. As discussed more fully below, this discard operation may be performed in connection with random early drop mechanisms, or the load shedding mechanisms, according to the present invention. Still further, NIC driver 83, in one implementation, is a software module that operates at periodic interrupts to process packets from inside NIC receive ring 81a to inside NIC receive queue 84a. At each interrupt, NIC driver 83 can process all packets in receive ring 81a or, as discussed more fully below, process a limited number of packets. Furthermore, as discussed more fully below, a fairness algorithm controls which of inside NIC receive ring 81a and outside NIC receive ring 81b to process first at each interrupt.

Inside NIC receive queue 84a, in one implementation, is a queue or other data structure of memory addresses spaces corresponding to packets stored in packet buffer 82. In one embodiment, inside NIC receive queue 84a is implemented as a linked list, where each entry in the list includes a pointer to the previous entry, a pointer to the packet in buffer 82, a pointer to the next entry. Of course, each entry in the list may include additional fields, such as flags and other data fields. In addition, inside NIC receive queue 84a can be implemented in other ways beyond linked lists. As discussed above, network device application 75, operating at a higher level, processes packets in packet buffer 82 popping packet pointers from receive queues 84a, 84b.

In one implementation, inside NIC receive ring 81a, outside NIC receive ring 81b, inside NIC receive queue 84a, outside NIC receive queue 84b, and packet buffer 82 are maintained in reserved spaces of the system memory of network device 30. The system memory implemented in network device 30, in one embodiment, includes one or more DRAM chips and a memory controller providing the interface, and handling the input-output operations, associated with storing data in the DRAM chip(s). In one implementation, the hardware in network device 30 includes functionality allowing first and second network interfaces 71, 72 to directly access memory 82 to store inbound packets received at the interfaces in packet buffer. For example, in one implementation, the system chip set associated with network device 30 can include a Direct Memory Access (DMA) controller, which is a circuit that allows for transfer of a block of data from the buffer memory of a network interface, for example, directly to memory 82 without CPU involvement. A variety of direct memory access technologies and protocols can be used, such as standard DMA, first-party DMA (bus mastering), and programmed I/O (PIO). In one implementation, each network interface 71 and 72 is allocated a DMA channel to the memory 82 to store packets received at the corresponding interfaces.

In addition, the system chip set of network device 30, in one implementation, further includes an interrupt controller to receive and prioritize interrupt requests (IRQs) transmitted by devices over the system bus. Network device 30, in one implementation, further includes an interrupt timer that periodically transmits an interrupt signal to the interrupt controller. In one implementation, the interrupt controller, after receiving the periodic interrupt signal, dedicates the CPU and other resources to NIC driver 83 to process received packets as discussed above. In one implementation, the interrupt timer transmits interrupt signals every 50 microseconds; of course, this interval is a matter of engineering or system design choice. In certain implementations of the present invention, network interfaces 71, 72 can transmit demand-based interrupts after packets have arrived.

B. Network Device Application

Network device application 75 generally refers to the functionality implemented by network device 30, such as network monitoring or reporting, application traffic management, security, virtual-private networking, and the like. For didactic purposes, network device 30 is an application traffic management appliance configured to manage network traffic traversing access link 21. The above-identified patents and patent applications, incorporated by reference herein, disclose various functionalities and features that may be incorporated into application traffic management devices according to various implementations of the present invention. One skilled in the art, however, will recognize that the load shedding functionality described herein may be integrated into a variety of network devices deployed in network environments, such as proxies, firewalls, packet capture or network monitoring equipment, VPN servers, a web services network gateways or brokers, and the like.

As FIG. 2 illustrates, network device application 75, in one implementation, includes a packet processor 92, flow control module 94, and traffic classification engine 96. Network device application 75, in one implementation, further comprises host database 134, flow database 135, measurement engine 140, management information base 138, and administrator interface 150. In one embodiment, the packet processor 92 is operative to process data packets, such as detecting new data flows, parsing the data packets for various attributes (such as source and destination addresses, and the like) and storing packet attributes in a buffer structure, and maintaining one or more measurement variables or statistics (such as packet count) in connection with the data flows and/or the source/destination hosts. The traffic classification engine 96, as discussed more fully below, is operative to classify data flows based on one or more attributes associated with the data flows. Traffic classification engine 96, in one implementation, stores traffic classes associated with data flows encountered during operation of network device 30, as well as manually created traffic classes configured by a network administrator, in a hierarchical traffic class structure. In one embodiment, traffic classification engine 96 stores traffic classes, in association with pointers to traffic management policies or pointers to data structures defining such traffic management policies. In one implementation, flow control module 94 is operative to apply bandwidth utilization controls to data flows traversing the access link 21 in the inbound and/or outbound directions.

As discussed above, in one implementation, network device application 75 further comprises measurement engine 140, management information base (MIB) 138, and administrator interface 150. Management information base 138 is a database of standard and extended network objects related to the operation of network device 30. Measurement engine 140 maintains measurement data relating to operation of network device 30 to allow for monitoring of bandwidth utilization and network performance across access link 21 with respect to a plurality of bandwidth utilization and other network statistics on an aggregate and/or per-traffic-class level.

Administrator interface 150 facilitates the configuration of network device 30 to adjust or change operational and configuration parameters associated with the device. For example, administrator interface 150 allows administrators to select identified traffic classes and associate them with traffic management policies. Administrator interface 150 also displays various views associated with a hierarchical traffic classification scheme and allows administrators to configure or revise the hierarchical traffic classification scheme. Administrator interface 150 can provide a command line interface or a graphical user interface accessible, for example, through a conventional browser on client device 42.

B.1. Packet Processing

As discussed above, packet processor 92, in one implementation, is operative to detect new data flows, instantiate data structures associated with the flows and parse packets to populate one or more fields in the data structures. In one embodiment, when packet processor 92 encounters a new data flow it stores the source and destination IP addresses contained in the packet headers in host database 134. Packet processor 92 further constructs a control block (flow) object including attributes characterizing a specific flow between two end systems. In one embodiment, packet processor 92 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Other flow attributes may include application specific attributes gleaned from layers above the TCP layer, such as codec identifiers for Voice over IP calls, Citrix database identifiers, and the like. Packet processor 92, in one embodiment, reserves memory space in the dynamic memory pool for storing such variably-sized attribute information as flows traverse network device 30. Packet processor 92 also stores meta information relating to the received packets in packet buffer 82. In one embodiment, the packets are stored in packet buffer 82 with a wrapper including various information fields, such as the time the packet was received, the packet flow direction (inbound or outbound), and a pointer to the control block object corresponding to the flow of which the packet is a part.

In typical network deployments, the majority of data flows are generally TCP or UDP flows. However, any suitable transport layer flow can be recognized and detected. As discussed more fully below, in one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 92 can determine a new data flow by detecting SYN, SYN/ACK, and/or ACK packets. However, a new data flow, depending on the network protocol associated with the flow, can simply be a data flow for which there is no corresponding flow object. For example, with UDP and GRE flows (where there is no explicit connection or handshake mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the last packet and the time of the current packet is greater than the threshold, the current packet is deemed part of a new flow. In another implementation, a background and/or separate process can periodically compare the last packet times associated with a flow to a threshold period of time and deem the flow terminated if the last packet time is beyond the threshold period of time. The termination of TCP connections is typically detected by identifying FIN packets; however, the timeout mechanisms discussed above can be used in situations where a FIN packet is not detected.

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. Nos. 6,046,980 and 6,591, 299, as well as others incorporated by reference herein, disclose classification of data flows for use in a packet-based communications environment. FIG. 1 illustrates the concept associated with inside and outside addresses. As discussed above, in one embodiment, a flow specification object includes an "inside" and "outside" address relative to network device 30. See FIG. 1. For a TCP/IP packet, packet processor 92 can compute the inside and outside addresses based on the source and destination network addresses of the packet and the direction of the packet flow.

In one embodiment, packet processor 92 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, packet count, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 92 hashes the values identified above and scans the hash table for a matching entry. If one exists, packet processor 92 associates the pointer to the corresponding control block object with the packets in the data flow.

To allow for identification of service types (e.g., FTP, HTTP, etc.), packet processor 92, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When network device 30 encounters a new flow, packet processor 92 analyzes the data flow against the service attributes in the services table to identify a service ID corresponding to the flow. In one embodiment, packet processor 92 may identify more than one service ID associated with the flow. In this instance, packet processor 92 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor 92 associates the flow with the most specific service ID. A traffic class maintained by traffic classification engine 96 may be configured to include matching rules based on the service IDs in the services table. For example, a matching rule directed to HTTP traffic may simply refer to the corresponding service ID, as opposed to the individual attributes that packet processor 92 uses to initially identify the service.

Packet processor 92, in one implementation, maintains certain data in host database 134 that support the selective load shedding operations described below. In one implementation, host database 134 maintains for each host address the following fields: 1) the number of new flows or connections for which the host is a client over the last minute [clientNewFPM]; 2) the number of current or existing TCP (or other handshake-oriented protocol) connections for which the host is a client [currentClientTCBs]; 3) the number of current UDP (or other similar protocol) connections for which the host is a client [currentClientUCBs]; 4) the number of new flows or connections for which the host is a server over the last minute [serverNewFPM]; 5) the number of current or existing TCP (or other handshake-oriented protocol) connections for which the host is a server [currentServerTCBs]; and 6) the number of current UDP (or other similar protocol) connections for which the host is a server [currentServerUCBs]. As discussed above, packet processor 92 is operative to identify new data flows, as well as the termination of existing data flows, and updates the statistics identified above as data flows traverse network device. As discussed below, NIC driver 83, in one implementation, is operative to access these values, as well as other data structures (e.g., flow database 135) to determine whether to discard a packet.

B.2. Traffic Classification

A traffic class comprises a set of matching rules or attributes allowing for logical grouping of data flows that share the same characteristic or set of characteristics-e.g., a service ID or type (see Section A.1., above), a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, network device 30 includes functionality allowing for classification of network traffic based on information from layers 2 to 7 of the OSI reference model. Network device 30 can be configured to include matching rules that define a plurality of network applications commonly found in enterprise networks, such as database applications, Citrix® flows, ERP applications, and the like.

In one embodiment, network device 30 is configured to include a predefined set of traffic classes based upon a knowledge base gleaned from observation of common or known traffic types on current networks. Network device 30, in one embodiment, also allows an administrator to manually create a traffic class by specifying a set of matching attributes. As discussed above, administrator interface 150, in one embodiment, allows for selection of a traffic class and the configuration of traffic management policies for the selected traffic class. Administrator interface 150, in one embodiment, also allows for the selection and arrangement of traffic classes into hierarchical reference trees. In one embodiment, traffic classification engine 96 also stores traffic classes added by the traffic discovery module. Furthermore, as discussed below, network device 30 may also include traffic class discovery functionality that automatically adds traffic classes to traffic classification engine 96 in response to data flows traversing the device. Automatic traffic discovery and classification is disclosed in U.S. Pat. Nos. 6,412,000, 6,457,051, and 6,591,299, which are incorporated herein by reference.

Traffic classification engine 96, in one implementation, stores traffic classes associated with data flows that traverse access link 21. Traffic classification engine 96, in one embodiment, stores the traffic classes and corresponding data (e.g., matching rules, policies, partition pointers, etc.) related to each traffic class in a hierarchical tree. This tree is organized to show parent-child relationships-that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

In one embodiment, the root traffic classifications are "/Inbound" and "/Outbound" data flows. Any data flow not explicitly classified is classified as "/Inbound/Default" or "/Outbound/Default". The "LocalHost" traffic class corresponds to data flows destined for network device 30, such as requests for stored measurement data or device configuration changes. In one embodiment, traffic classification engine 96 attempts to match to a leaf traffic class node before proceeding to remaining traffic class nodes in the hierarchical configuration. If a traffic class is found, the traffic classification engine 96 stops the instant search process and returns the identified traffic classification. Of course, one skilled in the art will recognize that alternative ways for traversing the hierarchical traffic class configuration can be implemented. For example, traffic classification engine 96 may be configured to traverse all traffic class nodes at a given level before proceeding to lower levels of the traffic classification tree. If more than one traffic class matches the data flow, traffic classification engine 96 can be configured with rules or other logic to select from one of the matching traffic classes.

In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Network device 30 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification engine 96 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

B.3. Flow Control Module

As discussed above, flow control module 94 applies bandwidth utilization controls (and, in some embodiments, other policies) to data flows traversing access link 21. The above-identified patents and patent applications describe the operations of, and bandwidth utilization controls, implemented or supported by flow control module 94. Network device 30, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention. The functionality of flow control module 94, in one implementation, can be conceptually segregated into three main tasks: 1) allocation of bandwidth to individual flows, 2)

enforcement of bandwidth allocations, and 3) monitoring of actual bandwidth utilization to provide feedback to subsequent bandwidth allocations.

Allocation of bandwidth is primarily influenced by three main factors: 1) the number of concurrent flows and their respective traffic classifications; 2) the overall or aggregate bandwidth utilization control scheme configured by the network administrator (such as the capacity of the access link, the partitions that have been configured, configured rate policies, and the like), and 3) the respective target rates corresponding to the individual flows. U.S. application Ser. No. 10/810,785 and U.S. Pat. Nos. 5,802,106 and 6,205,120, incorporated by reference above, disclose methods for determining target rates for data flows for use in bandwidth allocation decisions. As discussed above, a user can select a given traffic class and specify one or more bandwidth utilization controls for the traffic class. A bandwidth utilization control for a particular traffic class can comprise an aggregate bandwidth utilization control, a per-flow bandwidth utilization control, or a combination of the two (see Sections B.3.a.& B.3.b.). The combination of bandwidth utilization controls across the traffic classes defines an aggregate bandwidth utilization control scheme.

Flow control module 132 can use any suitable functionality to enforce bandwidth allocations known in the art, including, but not limited to class-based queuing, weighted fair queuing, class-based weighted fair queuing, Committed Access Rate (CAR) and "leaky bucket" techniques. Flow control module 132, in one implementation, may incorporate any or a subset of the TCP rate control functionality described in the cross-referenced U.S. patents and/or patent applications set forth above for controlling the rate of data flows.

C. Load Shedding Functionality

As discussed in more detail below, packet load shedding, according to implementations of the present invention, can be accomplished in one of two non-exclusive manners. In a first load shedding implementation, packets are selectively discarded based on the behavioral attributes of at least one of the source or destination hosts. In a second load shedding implementation, packets are discarded according to a low-level process that takes advantage of the characteristics of network interfaces to meter the influx of packets into network device 30.

C.1. Selective Packet Discard

In one implementation, network device 30 is operative to selectively discard packets based on the observed behaviors of the source or destination hosts corresponding to the packets. For example, as discussed more fully below, NIC driver 83 is operative to discard packets based on the number and frequency of data flows involving a given host.

C.1.a. Selective load Shedding Parameters

NIC driver 83, in one implementation, supports the following configurable parameters:

1) LSClientFPM is a threshold parameter specifying the a threshold number of new connections over a one-minute interval where a given host is a client.

2) LSNewFlowsOnly is a Boolean value indicating whether inbound queue manager 83 should discard packets corresponding only to new data flows. In one implementation, if this parameter is set, inbound queue manager 83 does not discard packets corresponding to existing flows (i.e., where packets corresponding to the flow have already been placed on queue structure 84).

3) LSClientTCBConn is a parameter defining a threshold number of data flows involving a hand-shake connection mechanism (such as TCP connections) for which the host is a client.

4) LSClientUCBConn is a parameter defining a threshold number of data flows that do not include hand-shake mechanisms (such as UDP and GRE flows) for which the host is a client.

5) LSServerFPM is threshold parameter specifying the a threshold number of new connections over a one-minute interval where a given host is a server.

6) LSServerTCBConn is a parameter defining a threshold number of data flows involving a hand-shake connection mechanism (such as TCP connections) for which the host is a server.

4) LSServerUCBConn is a parameter defining a threshold number of data flows that do not include hand-shake mechanisms (such as UDP and GRE flows) for which the host is a server.

In addition, the parameter nicRedStartDrop defines the threshold number of packets stored in the receive queues 84$a$ or 84$b$ before the random early drop mechanism is invoked. In one implementation, the random early drop mechanism, once invoked, operates until the number of packets in the receive queue 84$a$ or 84$b$ reaches a nicRedStopDrop threshold parameter. In one implementation, the selective load shedding operations discussed herein is invoked when the number of packets in one of the receive queues 84$a$ or 84$b$ exceeds the nicRedStopDrop parameter. In other implementations, a separate threshold value can be defined.

C.2.a. Load Shedding Operations

Figure 4A:
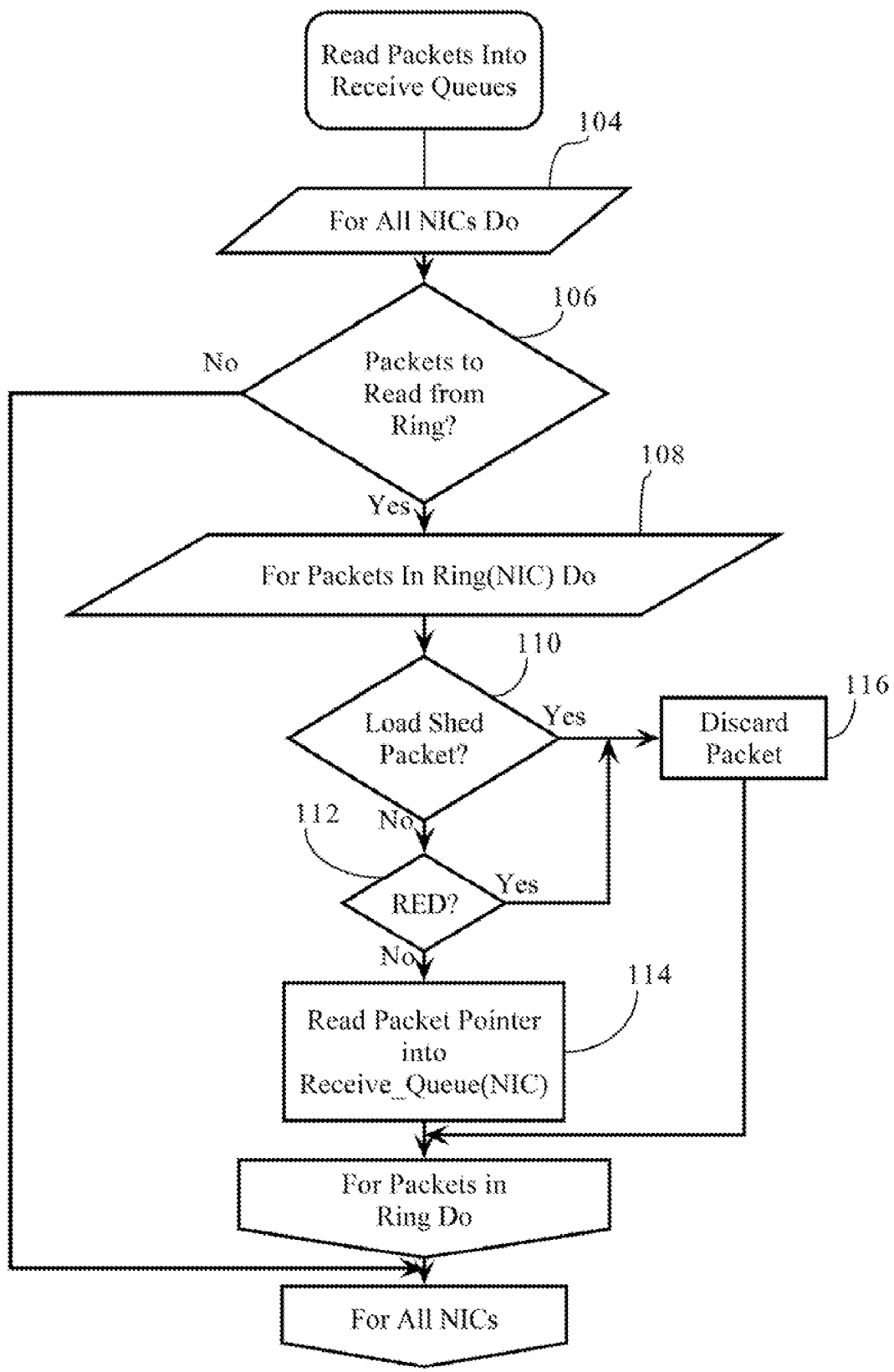
FIG. 4A is a flow chart diagram illustrating a method, according to an embodiment of the present invention, directed to preferentially shedding packet load.

As discussed above, after each interrupt, NIC driver 83 reads pointers to packets from inside and outside NIC receive rings 81$a$, 81$b$ into inside and outside receive queues 84$a$, 84$b$. As discussed above, inside and outside network interfaces 71, 72 continuously receive packets, storing pointers to packets in the receive rings 81$a$, 81$b$. FIG. 4A illustrates a method, according to one implementation of the present invention, directed to discarding packets. In one implementation, assuming the corresponding receive ring 81$a$ or 81$b$ includes packet pointers during the current interrupt interval (106), NIC driver 83, for all network interfaces (here, inside and outside interfaces 71, 72) (104), applies a selective load shedding mechanism (110) and, optionally, a random early drop (RED) mechanism (112) to each packet. As FIG. 4A illustrates, if the operation of either discard mechanism indicates that a packet should be dropped, NIC driver 83 discards the packet (116). Otherwise, NIC driver 83 reads the packet pointer into the corresponding receive queue 84$a$ or 84$b$ (114). In one implementation, NIC driver 83 can process all packets stored in the receive ring 81$a$, 81$b$ at the start of the interrupt interval (108). In another implementation, as discussed more fully below, the number of packets read from the receive rings 81$a$, 81$b$ during a given interrupt interval can be limited to a configurable number. In another implementation, the number of packets read during a given interrupt interval can be dynamically adjusted according to a second load shedding mechanism described in section B.2., below.

FIG. 4B illustrates the decisional logic in a selective loading function, according to one implementation of the present invention, associated with determining whether to discard a packet. In one implementation, the discard packet function returns a Boolean value indicating whether the packet should be discarded. As FIG. 4B provides, the selective load shedding operations described herein begin when the packet count of the inside or outside NIC receive queues 84$a$, 84$b$ exceeds nicRedStopDrop (see above) or some other threshold parameter (232). In one implementation, administrator interface 150 allows a network administrator to specifically exclude selected hosts from the selective load shedding operations described herein. For example, a network administrator may want to exclude a DNS server or other system that typically maintains a large number of connections. Accordingly, in one implementation, NIC driver 83 accesses the exclude list to determine whether the source or destination host identified in the packet (stored in packet buffer 82) is on the exclude list (234). If one of the hosts is excluded, the selective load shedding function returns a false (252). Otherwise, the packet load shedding function 136 accesses host database to determine whether source host is contained in the host database 134 (236). If host database 134 does not contain the source host address, the selective load shedding function returns false, allowing the packet to be read into the appropriate receive queue 84a, 84b. As discussed above, packet processor 92 will eventually process the packet (assuming it is not dropped according to the RED mechanism), storing the source and destination hosts in host database 134.

As FIG. 4B provides, the selective load shedding function then accesses host database 134 to compare certain observed parameters corresponding to the source host identified in the packet, and compares them against corresponding threshold values to determine whether to discard the packet. For example, the if the number of new data flows for which the source host identified in the packet is a client (clientNewFPM) currently exceeds the LSClientFPM parameter (238), and either the number of current TCP connections (currentTCBs) exceeds the LSTCBConn parameter (240), or the number of current UDP or similar connections (currentUCBs) exceeds LSClientUCBConn, the selective load shedding function returns true, which will cause NIC driver 83 to drop the packet. In addition, as FIG. 4B illustrates, if the LSNewFlowsOnly parameter is set (244), NIC driver 83 does not drop packets corresponding to existing data flows (246). In one implementation, NIC driver 83 determines whether the packet corresponds to an existing flow by creating a key by hashing the packet attributes discussed in section B.1., above, and comparing them to the entries in flow database 135. If a match is found, the packet is deemed to correspond to an existing flow. In another implementation, NIC driver 83 does not distinguish between handshake-type connections (e.g., TCP) and non-handshake-type connections (e.g., UDP), applying a single threshold determination for a total number of connections for which the host is a client.

According to the implementation described above, the packets corresponding to a compromised end system 42 transmitting SYN packets in a SYN attack, for example, will be discarded if the threshold parameters discussed above are exceeded. However, as network device application 75 processes the existing data flows, the connection values stored in host database 134 for the given host will eventually decrease to below the threshold parameters discussed above, which allows packets to be processed by network device 30. In this manner, implementations of the present invention allow network device 30 to selectively shed packet load necessary to efficiently and/or appropriately function. However, by allowing subsequent flows from the host to be classified and/or monitored by network device 30, the selective load shedding functionality allows network device 30 to gather meaningful data for diagnostic or other purposes. The load shedding functionality described herein also facilitates access to network device 30 by management applications or other administrative systems to transmit packets that will reach the higher-level processes implemented on network device 30.

Other implementations of the present invention can use different parameters in determining whether to discard packets. For example, the behavior of the destination host can be assessed in determining whether to discard packets. Specifically, and in one implementation, the LSServerFPM, LSServerTCBConn, and LSServerUCBConn parameters can be applied to the corresponding host database 134 variables (ServerNewFPM, currentServerTCBs, and currentServerUCBs, respectively) corresponding to the destination host identified in the packet. Still further, this server-based determination can be applied in addition to, or in lieu of, the client-based determination discussed above. For example, in one implementation, the server-based determinations can be applied after the client-based load shedding function (see FIG. 4A, 110) and before the Random Early Drop Mechanism (FIG. 4A, 112).

Figure 4C:
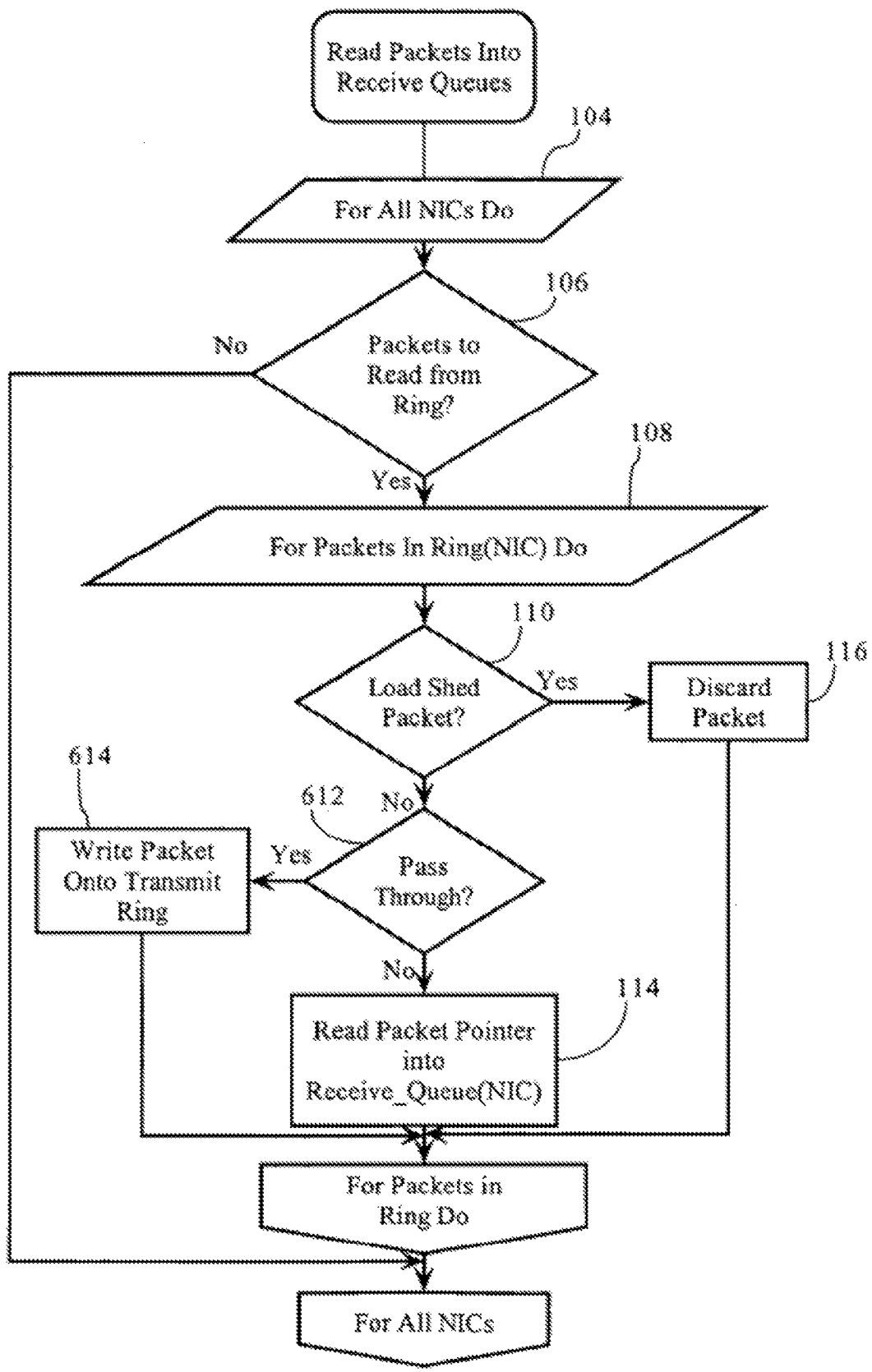
FIG. 4C is a flow chart diagram providing a method, according to another embodiment of the present invention, directed to preferentially shedding packet load by passing packets through the network device without higher level processing.

In other implementations, other load shedding or reduction mechanisms can be used in lieu of the random early drop mechanisms discussed above. As FIG. 4C illustrates, for example, assuming that the corresponding packet load threshold is exceeded, NIC driver 83 can be configured to essentially allow all packets received while the threshold is exceeded to pass through network device 30 without being processed. This implementation is especially useful for network devices, such as application traffic management devices, packet capture devices and the like, which receive packets at a network interface and pass the packets along a communications path. For example, NIC driver 83 can be configured to write all packets received after the threshold is crossed (612) directly onto a transmit ring or queue of an inside or outside network interface (614), essentially bypassing the higher level modules (such as packet processor 82, etc.) and attendant resource consumption. In one implementation, NIC driver 83 allows a user to choose between random early drop mechanisms and the pass-through mechanism by accessing administrator interface 150 and selecting the desired option.

C.2. Limiting Read Operations to Meter Influx of Packets

As discussed more fully below, a second implementation of the present invention takes advantage of the properties of network interfaces by adjusting the number of packets read from the inside and outside NIC receive rings 81a, 81b to meter packets that are processed by network device 30, consuming various resources such as available bandwidth across the system bus of network device 30. In addition, as discussed above, the second implementation of the present invention can be used alone or in combination with the selective load shedding functionality discussed in C.1. above.

C.2.a. Packet Metering Parameters

In order to better understand the implementations of the present invention, the meaning and significance of the following variables are described below:

1) LSPktsLmt(NIC): the limit on the number of packets read from a given receive ring 81a, 81b at each interrupt;

2) LSPktsCapacity: a parameter defining the maximum through-put in packets per interrupt in both directions;

3) LSTtlPktsRcvd: the total number of packets received at all interfaces and read into the NIC receive rings during an interrupt;

4) LSPktsRcvd(NIC): number of packets received at a given interface and read into a NIC receive ring during an interrupt; and 5) LSPrvDecrement: identifier of NIC decremented during the previous interrupt.

According to the implementation of the invention described below, the load shedding functionality is oriented around the capacity of network device to process packets received in both directions—LSPktsCapacity, which defines the maximum through-put in packets during each interrupt. The value of LSPktsCapacity depends on a number of factors including the capacity of the hardware (e.g., the CPU, system bus, memory, etc.), the software processing time, as well as the presence of other load shedding mechanisms. In addition, the value of LSPktsCapacity can be adjusted based on heuristic evaluations of the performance of network device under high packet loads during, for example, simulated SYN flood attacks. In addition, according to the implementation described below, the LSPktsLmt(NIC) parameter effectively limits the number of packets received at a given interface during a previous interrupt (LSPktsRcvd(NIC)), when the corresponding NIC receive ring is full. In other words, when a NIC receive ring is full and NIC driver 83 only reads a limited number of packets (LSPktsLmt(NIC)) from the ring, the interface is only capable of reading up to that number of packets back into the receive ring before it becomes full again, and subsequent packets are discarded.

C.2.b. Overall Process Flow and Polling Fairness Algorithm

FIG. 5A illustrates the overall process flow according to one implementation of the present invention. As FIG. 5A provides, at initialization, NIC driver 83 sets the LSPktsLmt (NIC) to LSPktsCapacity for all interfaces (302). Similar to the system discussed above, NIC driver 83, at each interrupt (304), runs a polling fairness algorithm that determines which interface is polled first during the interval (306) (see below). NIC driver 83 then, starting with the first interface, reads a number of packets from the receive rings (e.g., rings 81*a*, 81*b*) up to LSPktsLmt(NIC) for each interface (308), as described in more detail below. After these read operations, NIC driver then adjusts the packet read limits, LSPktsLmt(NIC), for at least one interface (310).

FIGS. 6A and 7A set forth two polling fairness algorithms according to certain implementations of the present invention. FIG. 6A is a matrix of interface or port identifiers for a network device 30 that includes six interfaces. FIG. 7A is a matrix for a network device 30 that includes four interfaces. A matrix defining a fairness algorithm for two network interfaces 71, 72 is simply a 2×2 matrix (not shown). More specifically, each row of a given matrix defines the order in which NIC driver 83 reads packets from the corresponding NIC receive rings (e.g., 81*a*, 81*b*). Accordingly, during a first cycle, NIC driver reads up to the LSPktsLmt(0), from the NIC receive ring corresponding to interface 0, and then proceeds to interface 1 and so on. NIC driver 83 steps down to the next row of the fairness matrix at each interrupt, cycling through the matrix during the operation of network device 30. The fairness algorithms defined in FIGS. 6A and 7A ensure that NIC driver 83, on average, polls each NIC receive ring equally at a specific position in the order. In addition, the matrices also ensures fairness based on the relative positions of any two interfaces. For example, according to the matrix in FIG. 6A, interface 0 is polled ahead of interface 43 out of 6 times, and behind 3 out of 6 times. As one skilled in the art will recognize, the fairness algorithms defined in FIGS. 6A and 7A are for didactic purposes. Other fairness algorithms can be used as well. As discussed more fully below, a separate fairness algorithm is used in connection with adjusting the read limits associated with the interfaces.

C.2.c. Adjusting Packet Read Limits

Figure 5B:
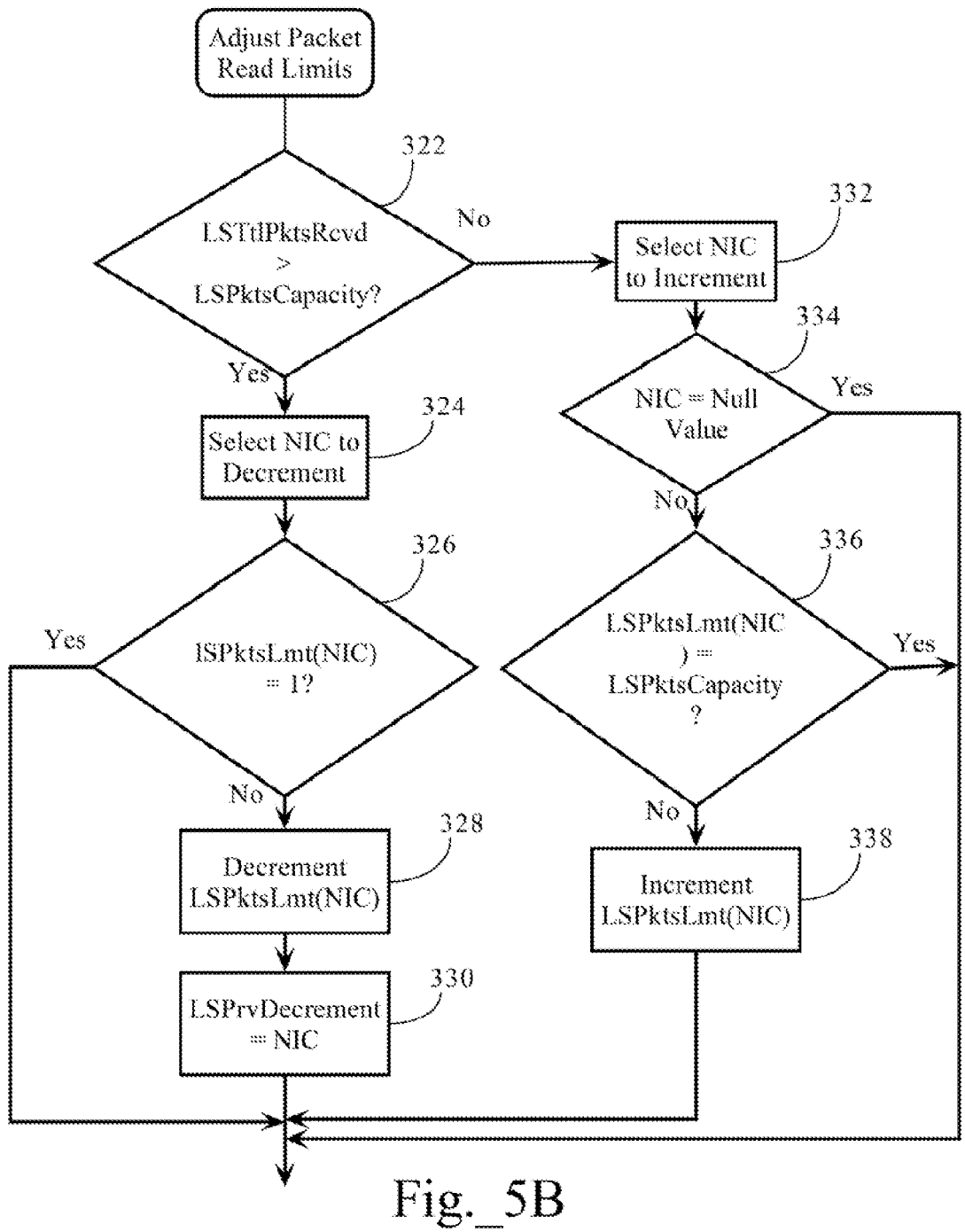
FIG. 5B is a flow chart diagram illustrating the decisional factors associated with adjusting a packet read limit.

FIG. 5B illustrates a method, according to one implementation, for adjusting the packet read limits, LSPktsLmt(NIC), associated with the interfaces of network device 30. As FIG. 5B provides, one packet read limit is possibly incremented or decremented at each interrupt based on the loading conditions observed at the interfaces. Specifically, as FIG. 5B illustrates, if the total number of packets received at all interfaces, LSTtlPktsRcvd, is greater than the LSPktsCapacity (322), NIC driver 83 selects an interface, if any, whose LSPktsLmt(NIC) should be decremented (324). Otherwise, NIC driver 83 selects an interface, if any, whose LSPktsLmt(NIC) should be incremented (332). FIGS. 5C and 5D, described in more detail below, illustrate the decisional steps, according to one implementation, for selecting interfaces whose read limits are incremented or decremented, respectively. As FIG. 5B illustrates, after an interface read limit has been selected for decrementing, NIC driver 83 determines decrements the LSPktsLmt(NIC) for the selected interface (328) and sets the LSPrvDecrement to the selected interface (330), unless LSPktsLmt(NIC) equals one (326). In addition, after an interface read limit has been selected (332), NIC driver 83 increments the LSPktsLmt(NIC) for the selected interface (338), unless the interface selection logic returns a null value (334) or LSPktsLmt(NIC) for that interface equals LSPktsCapacity (336). In one implementation, the LSPktsLmt(NIC) values are decremented or incremented by one at each interrupt. In other implementations, the values can be adjusted in greater amounts. In one implementation, the adjustment values can decay as the LSPktsLmt(NIC) values approach their respective minimum or maximum values.

FIG. 5C illustrates the decisional logic, according to one implementation of the present invention, directed to selecting an interface whose LSPktsLmt(NIC) value is to be incremented. As FIG. 5C illustrates, NIC driver 83, in one implementation, applies certain decisional criteria, cycling through a list of interfaces ordered according to a selection fairness algorithm. FIGS. 6B and 7B illustrate selection fairness algorithms according to certain implementations of the present invention. Similar to the polling fairness algorithms, the matrix set forth in FIG. 6B is used in connection with a network device that includes six interfaces, while the matrix of FIG. 7B is used in connection with a four-interface device. In addition, the selection fairness algorithm is based in part on the polling fairness algorithm. For example, since each interface has a fair chance of being polled, the selection fairness algorithm starts with the last interface that was polled, and then proceeds in ascending order. In a two-interface device, the selection fairness algorithm or matrix is simply the opposite of the polling fairness algorithm. Starting with the first interface (352), NIC driver 83 selects the interface whose read limit, LSPktsLmt(NIC), equals the number of packets received at that interface (LSPktsRcvd(NIC)) (356) and whose LSPktsLmt(NIC) was not decremented during the previous interrupt (354). NIC driver 83 applies these decisional criteria to all interfaces in the order defined by the selection fairness algorithm until an interface satisfies both criteria (see 360, 362, 358). If no interface satisfies these criteria, the selection logic returns a null value (364).

FIG. 5D sets for the selection logic, according to an implementation of the present invention, directed to decrementing a LSPktsLmt(NIC) for a given interface. As FIG. 5D illustrates, NIC driver 83 inspects the LSPktsRcvd(NIC) for each interface to identify the most heavily loaded interface (372). In the case of a tie (374), NIC driver 83 selects the first from among the most heavily loaded interfaces based on the order in the current cycle of the selection fairness algorithm, above (376).

As the foregoing illustrates, this implementation essentially uses the inherent properties of network interfaces 71, 72 to discard packets without substantially impacting the system resources of network device 30. That is, when the receive rings are full, network interfaces 71, 72 discard subsequently received packets until additional packets are read, which clears entries in the receive rings. By allowing the receive rings to fill and only reading a limited number of packets from the receive rings, the present invention uses the network interfaces 71, 72 to meter packets into the system and prevents discarded packets from consuming system resources, such as bandwidth across the system bus, or memory space, in network device 30.

Lastly, although the present invention has been described as operating in connection with end systems and networks primarily employing the HTTP, TCP and IP protocols, the present invention has application in computer network environments employing any suitable network protocol suite. In addition, while, in the embodiments described above, the operations associated with the present invention are distributed across various modules, a variety of other implementations featuring different distributions of the operations are possible. For example, a module separate from NIC driver 83 can be configured to adjust the read limits. In addition, a separate NIC driver can be configured for each physical network interface. Still further, while certain of the implementations described above include two interfaces, the present invention can be applied to network devices having one to a plurality of network interfaces. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method, comprising
storing packets received at a network interface in a packet buffer;
maintaining a first data structure for storing pointers to packets in the packet buffer;
maintaining a second data structure for storing pointers to packets read from the first data structure;
the network interface reading, responsive to receiving a packet at the network interface, the packet in the packet buffer and storing a pointer to the packet in the first data structure;
the network interface further discarding received packets when the first data structure is full;
monitoring the number of packets based on the pointers stored in the first data structure; and
reading a limited number of packet pointers from the first data structure to the second data structure based on a read limit corresponding to the at least one network interface.

2. The method of claim 1 further comprising
adjusting the read limit for at least one of the network interface based on observed aggregate packet load across the network interfaces.

3. The method of claim 1 wherein the first data structure is a ring.

4. The method of claim 1 wherein the second data structure is a queue.

5. The method of claim 1 further comprising
processing the packets for which pointers are stored in the second data structure.

6. A method enabling a selective load shedding mechanism, comprising
storing packets received at a network interface in a packet buffer;
maintaining a first data structure for storing pointers to packets in the packet buffer;
maintaining a second data structure for storing pointers to packets read from the first data structure;
the network interface reading, responsive to receiving a packet at the network interface, the packet in the packet buffer and storing a pointer to the packet in the first data structure;
reading a limited number of packet pointers from the first data structure to the second data structure based on a read limit corresponding to the at least one network interface;
monitoring the number of received packets based on the pointers stored in a buffer the first data structure relative to a threshold value; and
the network interface further discarding received packets when the first data structure is full, wherein further discarding the received packets comprises:
if the number of received packets stored in the first data structure exceeds the threshold value, then
selectively discarding subsequently received packets based on the observed behavior of the source or destination hosts identified in the packets, wherein the observed behavior comprises a number of flows associated with either the source or destination host.

7. The method of claim 6 wherein the number of flows comprises a number of new flows within a given time interval.

8. The method of claim 6 further comprising
if the number of received packets stored in the first data structure exceeds a second threshold value, then
randomly discarding subsequently received packets.

9. The method of claim 6 further comprising
if the number of received packets stored in the first data structure exceeds a second threshold value, then
passing subsequently received packets directly onto the destination host without higher level processing.

10. A method enabling a selective load shedding mechanism, comprising
storing packets received at a network interface in a packet buffer;
maintaining a first data structure for storing pointers to packets in the packet buffer;
maintaining a second data structure for storing pointers to packets read from the first data structure;
the network interface reading, responsive to receiving a packet at the network interface, the packet in the packet buffer and storing a pointer to the packet in the first data structure;
reading a limited number of packet pointers from the first data structure to the second data structure based on a read limit corresponding to the at least one network interface;
monitoring the number of received packets based on the pointers stored in a buffer the first data structure;
monitoring the data flows corresponding to the source hosts relative to at least one attribute;
the network interface further discarding received packets when the first data structure is full, wherein further discarding the received packets comprises:
if the number of received packets stored in the buffer first data structure exceeds a threshold value, then
selectively discarding received packets based on the at least one attribute associated with the source hosts identified in the received packets, wherein the at least one attribute comprises a number of current flows.

11. The method of claim 10 wherein the number of flows comprises a number of flows within a given time interval.

12. The method of claim 10 further comprising if the number of received packets stored in the first data structure exceeds a second threshold value, then randomly discarding subsequently received packets.

13. The method of claim 10 further comprising
if the number of received packets stored in the first data structure exceeds a second threshold value, then passing subsequently received packets directly onto the destination host without higher level processing.

14. The method of claim 10 wherein the at least one attribute further comprises the number of packets received in a given time interval.

15. The method of claim 10 wherein the at least one attribute further comprises the number of bytes received in a given time interval.

* * * * *

UNITED STATES PATENT AND TRADEMARK OFFICE
CERTIFICATE OF CORRECTION

PATENT NO.         : 7,813,352 B2                         Page 1 of 1
APPLICATION NO.    : 12/100850
DATED              : October 12, 2010
INVENTOR(S)        : Guy Riddle et al.

It is certified that error appears in the above-identified patent and that said Letters Patent is hereby corrected as shown below:

Col. 22, Ln. 59: After "stored in the" delete "buffer"

Col. 22, Ln. 66: After "number of" insert "new"

Signed and Sealed this
Fourteenth Day of June, 2011

David J. Kappos
*Director of the United States Patent and Trademark Office*